United States Patent
Wu

(10) Patent No.: US 6,561,447 B2
(45) Date of Patent: May 13, 2003

(54) BIFUNCTION CONDIMENT GRINDING TOOL

(75) Inventor: Hua-Te Wu, Tainan (TW)

(73) Assignee: Yienn Lih Enterprise Co., Ltd., Tainan (TW)

( * ) Notice: Subject to any disclaimer, the term of this patent is extended or adjusted under 35 U.S.C. 154(b) by 0 days.

(21) Appl. No.: 09/953,874

(22) Filed: Sep. 18, 2001

(65) Prior Publication Data
US 2003/0052207 A1 Mar. 20, 2003

(51) Int. Cl.⁷ .................................................. H47J 42/04
(52) U.S. Cl. ..................................................... 241/169.1
(58) Field of Search ............................. 241/168, 169.1

(56) References Cited

U.S. PATENT DOCUMENTS 3,827,641 A * 8/1974 Andersson ............. 241/101.01
4,925,150 A * 5/1990 Tedioli ..................... 241/169.1

* cited by examiner

Primary Examiner—Mark Rosenbaum
(74) Attorney, Agent, or Firm—Rosenberg, Klein & Lee

(57) ABSTRACT

A bifunction condiment grinding tool has a first and a second turnable housings with an interposed member provided in between; the housings each defines a condiment receiving compartment. A shaft is passed through the center of the housings and the interposed member. Two grinding assemblies are connected to a respective one of the housings, and each has an inner grinding element and an outer grinding element; the outer grinding elements are secured to the housings, and the inner grinding elements are each connected to one end of the shaft. The shaft is further connected to two one-way members disposed in a respective one of the housings. In the upright position where the first housing is above the second housing, the one-way member of the first housing can cause the shaft to turn together therewith only when the same is turned clockwise, and in that case, the inner grinding element in the second housing turns relative to the corresponding outer grinding element to grind the condiment received in the second housing; while in the upside down position where the second housing is above the first housing, the one-way member of the second housing can cause the shaft to turn together therewith only when the same is turned counterclockwise, and in that case, the inner grinding element of the first housing, currently in the lower position, turns relative to the corresponding outer grinding element to grind the condiment received in the first housing.

10 Claims, 7 Drawing Sheets

BIFUNCTION CONDIMENT GRINDING TOOL

BACKGROUND OF THE INVENTION

The present invention relates to a bifunction condiment grinding tool, and more particularly, to a bifunction grinding tool, which has two compartments, and can be used for grinding one kind of condiment with in an upright position, and for grinding the other kind condiment with in an upside down position.

Referring to FIG. 9, a conventional condiment grinding tool includes a main body 10, an upper turnable member 30, and a grinding assembly 20 consisting of an inner grinding element 201 and an outer grinding element 202. The turnable member 30 is turnably fitted on top of the main body, and is connected to an upper end portion of a shaft 203. The outer element 202 is fixedly received in the main body 10. The inner element 201 is turnably received in the outer element 202, and is connected to a lower end of the shaft 203. Thus, the inner element 201 is turned relative to the outer element 202 to grind the condiment disposed between the grinding elements 201 and 202 when a user holds the main body 10 with one hand and turns the turnable member 30 with the other hand. In addition, a knob 204 is screwed onto the upper end of the shaft 203 such that the user can adjust the fineness of the ground condiment by changing the position of the inner element 201 relative to the outer element 202 with the knob 204.

However, such a grinding tool can only contain a kind of condiment, therefore the user has to prepare many such tools for the many kinds of condiments in the kitchen. Consequently, the grinding tools would occupy much space and cause the user inconvenience.

SUMMARY OF THE INVENTION

Therefore, it is a main object of the present invention to provide a bifunction condiment grinding tool so as to reduce the number of grinding tools needed; the bifunction grinding tool contains two different kinds of condiments in two compartments such that the two kinds of the condiments can be ground individually when the grinding tool is manipulated in an upright position and in an upside down position respectively.

The bifunction condiment grinding tool of the present invention includes an interposed member, a first and a second housings, a first and a second one-way members, a shaft, a first and a second grinding assemblies. The interposed member has a central hole. The housings are each turnably connected to one end of the interposed member, and each has a first receiving hole adjacent to the interposed member and a second receiving hole at the other end. The housings contain a first and a second condiments respectively.

The one-way members are disposed in the first and the second housings respectively, and each has a main body secured to one of the first receiving holes.

The grinding assemblies each consists of an inner grinding element connected to one of two ends of the shaft, and an outer grinding element secured to one of the second receiving holes of the housings as well as mounted on the inner grinding element.

The shaft is passed through the one-way members and the central hole of the interposed member. In the upright position where the first housing is above the second housing, the one-way member of the first housing can cause the shaft to turn together therewith only when the same is turned in a first direction; while in the upside down position where the second housing is above the first housing, the one-way member of the second housing can cause the shaft to turn together therewith only when the same is turned in a second direction opposite the first direction. When the shaft turns in the first direction under the upright position, the same disengages the one-way member of the second housing so as to allow the second housing to be held still, permitting the inner grinding element in the second housing to turn relative to the corresponding outer grinding element. Similarly, when the shaft turns in the second direction under the upside down position, the same disengages the one-way member of the first housing (currently in the lower position) so as to allow the first housing to be held still, permitting the inner grinding element in the first housing to turn relative the corresponding outer grinding element.

Thus, the second condiment is ground by the second grinding assembly when the first housing is turned in the first direction relative to the second housing with the grinding tool being kept in an upright position where the first housing is kept above the second housing. And, when the grinding tool is held upside down from the first housing, and the second housing is turned in the second direction relative to the first housing, the first condiment is ground between the grinding elements of the first grinding assembly.

BRIEF DESCRIPTION OF THE DRAWINGS

This invention will be better understood by referring to the accompanying drawings, wherein.

DETAILED DESCRIPTION OF THE PREFERRED EMBODIMENTS

Figure 1:
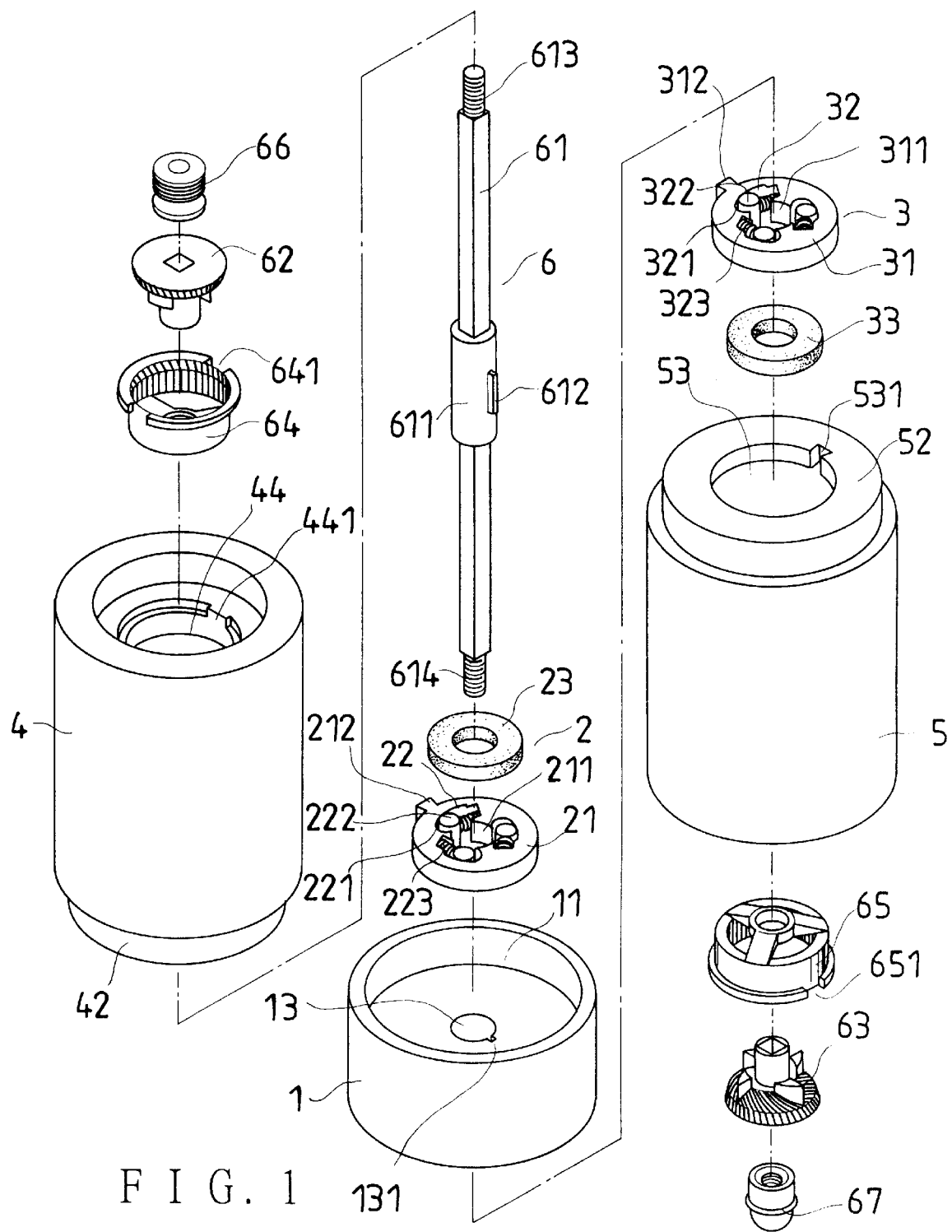
FIG. 1 is an exploded perspective view of the condiment grinding tool in a first embodiment of the present invention.
Figure 2:
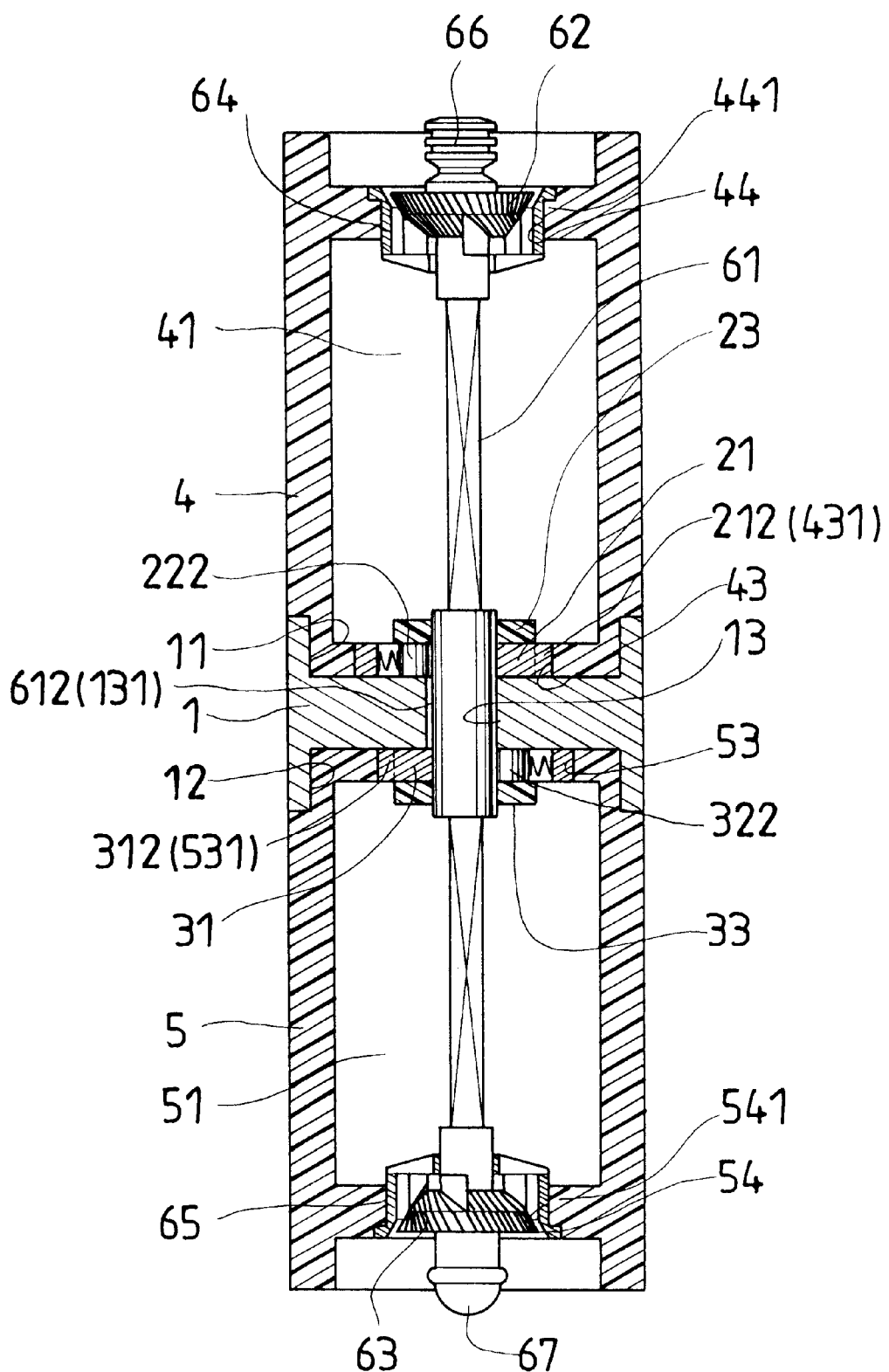
FIG. 2 is a section view of the grinding tool in FIG. 1.

Referring to FIGS. 1 and 2, a bifunction condiment grinding tool of the present invention includes an interposed member 1, a first one-way member 2, a second one-way member 3, a first housing 4, a second housing 5, a first grinding assembly consisting of both an inner and an outer grinding elements 62 and 64, a second grinding assembly consisting of both an inner and an outer grinding elements 63 and 65 and a shaft 61.

The interposed member 1 has receiving rooms 11 and 12 in the upper and lower parts respectively, and has a middle part having a central hole 13, and an engaging gap 131 communicating with the hole 13.

The first and the second housings 4 and 5 each has a connecting end portion 42 and 52 at one end, a first receiving hole 43 and 53 defined by the connecting end portion 42 and 52, and a second receiving hole 44 and 54 at the other end; the first receiving holes 43 and 53 each has a gap 431 and 531 formed on the edge; the second receiving holes 44 and 54 each has holding trenches (not numbered) formed on the edge and engaging blocks 441 and 541 formed between the holding trenches. The connecting end portions 42 and 52 of the first and the second housings 4 and 5 are connected to the receiving rooms 11 and 12 of the interposed member 1 respectively to form the main body of the grinding tool; thus, when the main body is kept upright, the second receiving hole 44 of the first housing 4 faces up, while that 54 of the second housing 5 faces down.

The shaft 61 has a cylindrical portion 611 at the middle, an engaging bar 612 projecting sideways and lengthwise from the middle part of the cylindrical portion 611, and two polygonal rods (not numbered) projecting from the upper and the lower ends of the cylindrical portion 611 respectively. The shaft 61 further has an upper and a lower threaded end portion 613 and 614 at two ends. The shaft 61 is passed through the central hole 13 of the interposed member 1 with the engaging bar 612 engaging the engaging gap 131 of the central hole 13.

The outer grinding element 64 of the first grinding assembly has flanges (not numbered), and engaging gaps 641 between the flanges. The outer element 64 is fitted into the second receiving hole 44 of the first housing 4 with the flanges being held in the holding trenches and with the engaging gaps 641 being connected to the engaging blocks 441. The inner grinding element 62 has a central polygonal hole, and is turnably received in the outer element 64 and mounted around the upper polygonal rod of the shaft 61 with a knob 66 being screwed onto the upper threaded end portion 613. Thus, the inner grinding element 62 can turn relative to the outer element 64 when the shaft 61 turns. The knob 66 is provided to prevent the inner element 62 from falling off as well as to allow the user to change the position of the inner element 62 relative to the outer element 64 so as to adjust the fineness of the ground condiment. The outer grinding element 65 has the same shape as the element 64, and is secured in the second receiving hole 54 of the second housing 5 in the above-mentioned way. The inner grinding element 63 is also turnably received in the outer element 65 with a central polygonal hole being mounted around the lower polygonal rod of the shaft 61; a knob 67 is screwed onto the lower threaded end portion 614 of the shaft 61 for securing the inner element 63 and adjusting the position of the same with.

Figure 3:
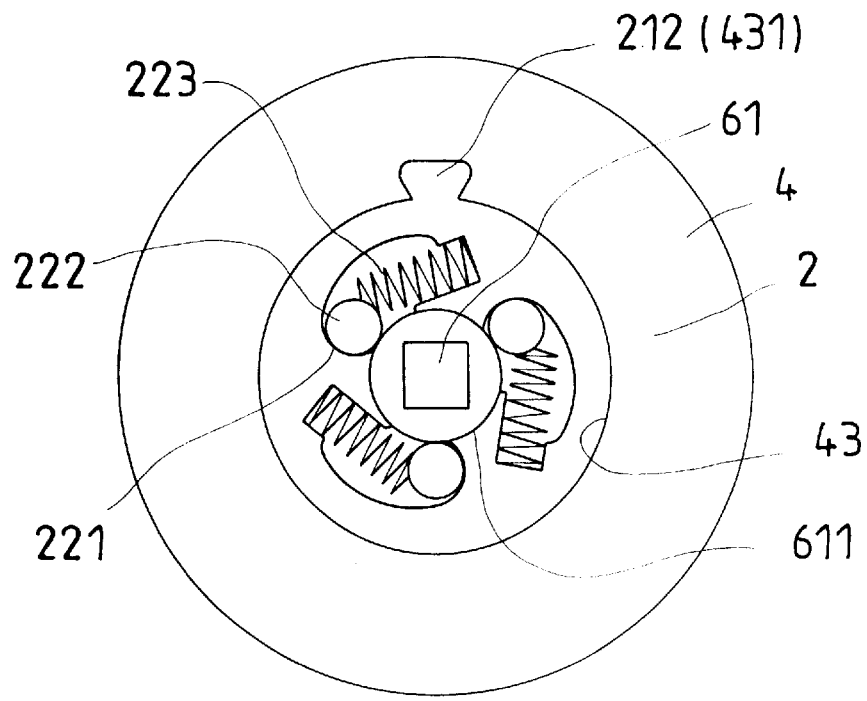
FIG. 3 is a top view of the one-way member in the first embodiment of the present invention in the locking position.
Figure 4:
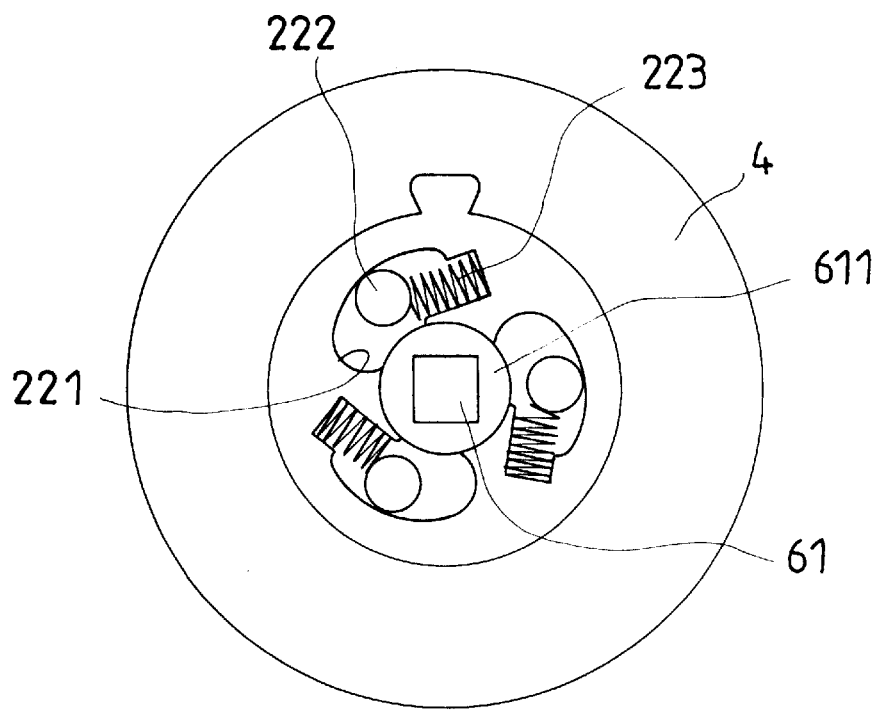
FIG. 4 is a top view of the one-way member in FIG. 3 in the unlocking position.

Referring to FIGS. 1, 3 and 4, the first one-way member 2 includes a main body 21 and a cover 23. The main body 21 has a sideways protrusion 212, a central round hole 211, several curved slots 22, which are arranged around, and communicate with the round hole 211. The curved slots 22 each has an engaging end portion 221, which receives an engaging block 222 biased thereto by a spring 223 connected to both the engaging block 222 and the wall of the curved slot 22. The main body 21 is mounted around the cylindrical portion 611 of the shaft 61 from the central round hole 211, and received in the first receiving hole 43 of the first housing 4 with the sideways protrusion 212 being connected to the gap 431. The cover 23 is also mounted around the cylindrical portion of the shaft 61, and disposed on top of the main body 21 so as to prevent the condiment from falling into the main body 21.

The second one-way member 3 includes a main body 31 and a cover 33. The main body 31 is the same as the main body 21, having a sideways protrusion 312, a central round hole 311, several curved slots 32, which each has an engaging end portion 321 receiving an engaging block 322 biased thereto by a spring 323. The main body 31 is mounted around the lower part of the cylindrical portion, and received in the first receiving hole 53 of the second housing 5 with the protrusion 312 engaging the gap 531; the cover 33 is disposed on the main body 31.

Thus, when the second housing 5 is held still under the first housing 4, and the first housing is turned clockwise, the engaging blocks 222 will engage the cylindrical portion 611 so as to make the shaft 61 turn together with the main body 21, while the cylindrical portion 611 will not cause the main body 31 of the second one-way member 3 to turn because the engaging blocks 322 disengage the cylindrical portion 611 when the shaft turns clockwise relative to the second one-way member. Therefore, the first kind of condiment having fallen into between the inner and the outer grinding elements 63 and 65 of the second grinding assembly is ground between the inner and the outer elements 63 and 65, while both the inner and the outer elements 62 and 64 will turn together with the first housing 4 in the clockwise direction.

When the grinding tool is moved to the upside down position where the second housing 5 is above the first housing 4, and when the first housing 4 is held still and the second housing 5 turned counterclockwise, the engaging blocks 322 will engage the cylindrical portion 611 so as to make the shaft 61 turn together with the main body 31. And, the main body 21 of the first one-way member 2 will not turn together with the shaft 61 because the engaging blocks 222 in the housing 4 (currently in the lower position) don't engage the cylindrical portion 611 turning counterclockwise. Therefore, the second kind of condiment having fallen into between the inner and the outer grinding elements 62 and 64 is ground therein.

Figure 5:
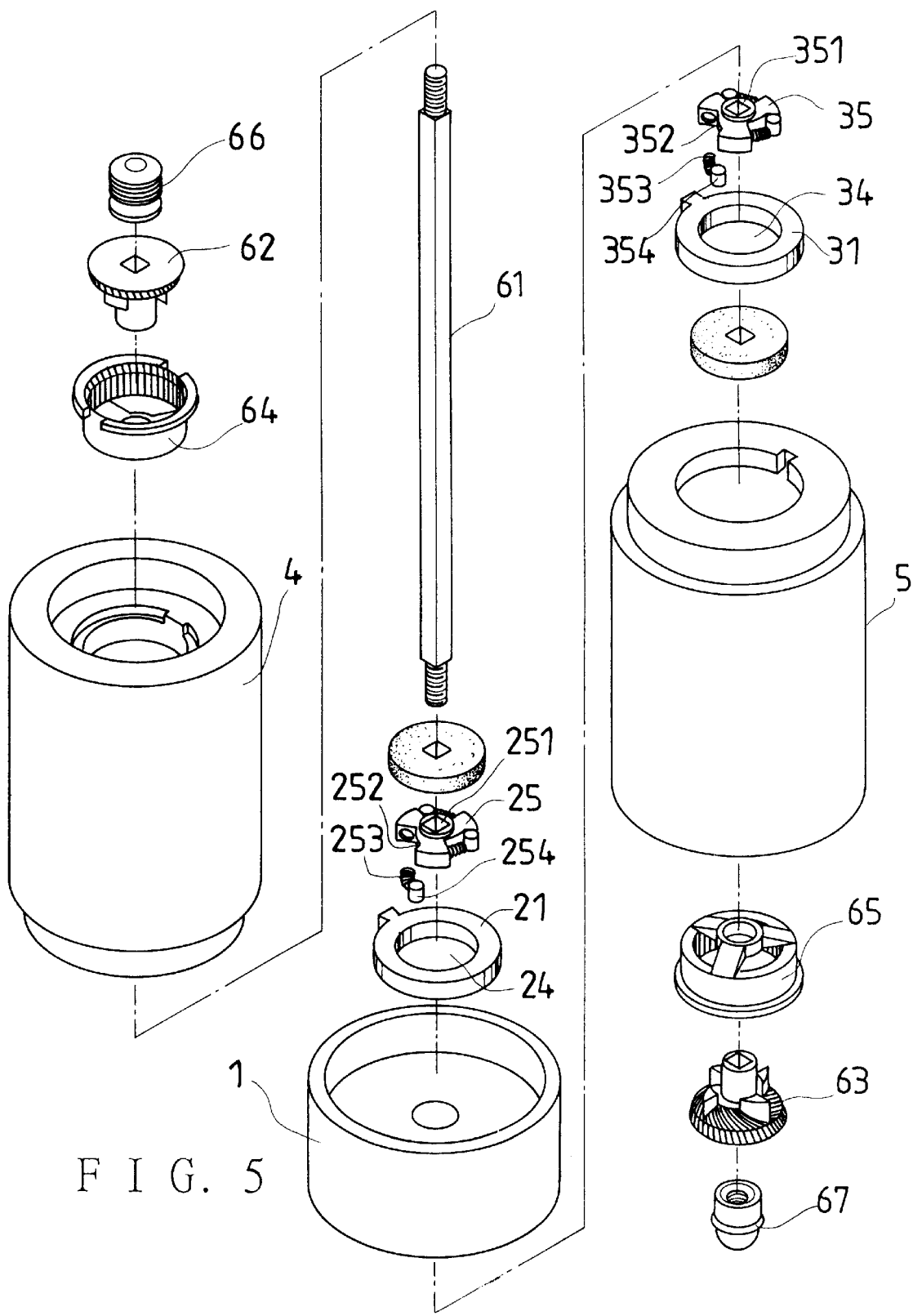
FIG. 5 is an exploded perspective view of the condiment grinding tool in the second embodiment of the present invention.
Figure 6:
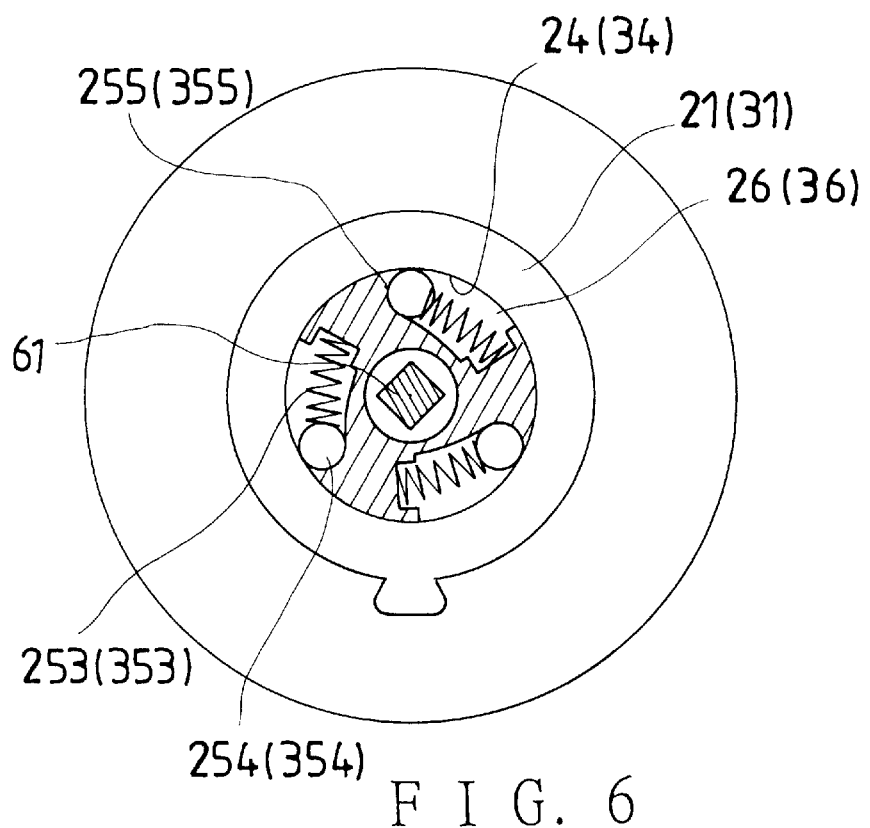
FIG. 6 is a top view of the one-way member of the second embodiment in FIG. 5.

The one-way members of the grinding tool of the present invention can take other forms. Referring to FIG. 5, according to a second embodiment of the present invention, a first and a second one-way members 2 and 3 are used instead of those of the first embodiment, and each includes a ring 21 (31) having both a central round hole 24 (34) and a sideways protrusion (not numbered), and an engaging body 25 (35), which has a central polygonal hole 251 (351), several receiving rooms 252 (352); referring to FIG. 6, the receiving rooms 252 (352) each has an engaging end portion 255 (355), and each receives an engaging block 254 (354) biased to the related engaging end portion 255 (355) by a spring 253 (353). The shaft of the first embodiment is replaced with a shaft 61 only having a polygonal shape in the middle and two threaded end portion. The ring 21 (31) and the engaging body 25 (35) are passed around the shaft 61 as shown in FIG. 5, and the rings 21 and 31 are mounted around the engaging bodies 25 and 35 respectively. Thus, when the second housing 5 is held still under the first housing 4, and the first housing 4 is turned counterclockwise, the shaft 61 will turn in the same direction due to the engagement between the engaging body 25 and the ring 21, which have the same function as the one-way members of the first embodiment, i.e. the engaging body 25 of FIG. 6 can turn together with the ring 21 only when the ring 21 is turned counterclockwise. Therefore, the grinding tool of the second embodiment can be used for grinding two kinds of condiments individually.

Figure 8:
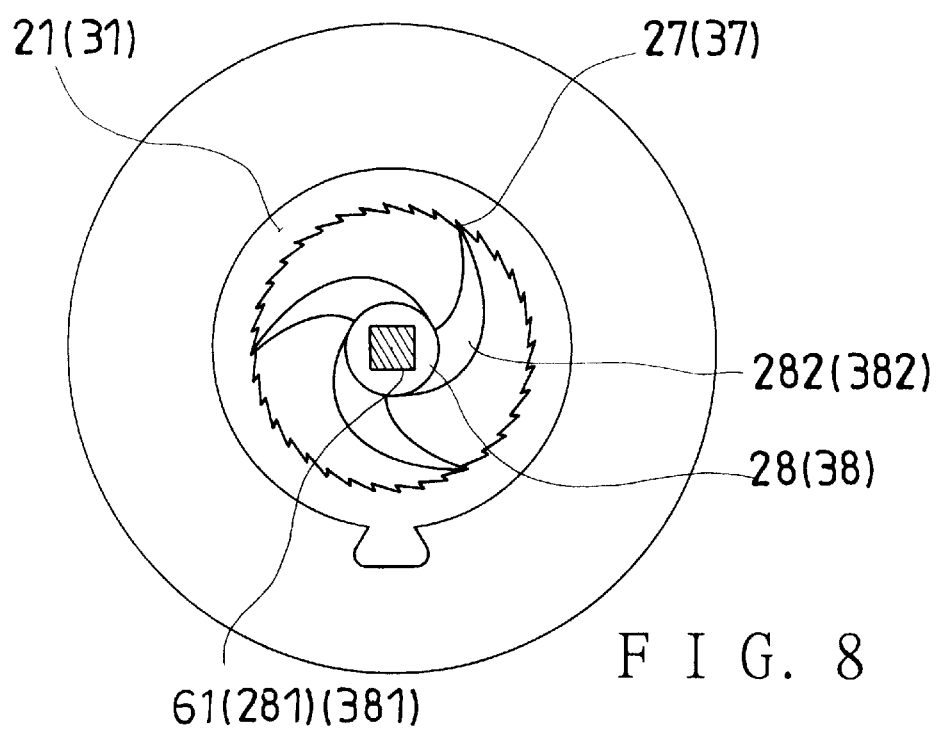
FIG. 8 is a top view of the one-way member of the third embodiment in FIG. 7.
Figure 7:
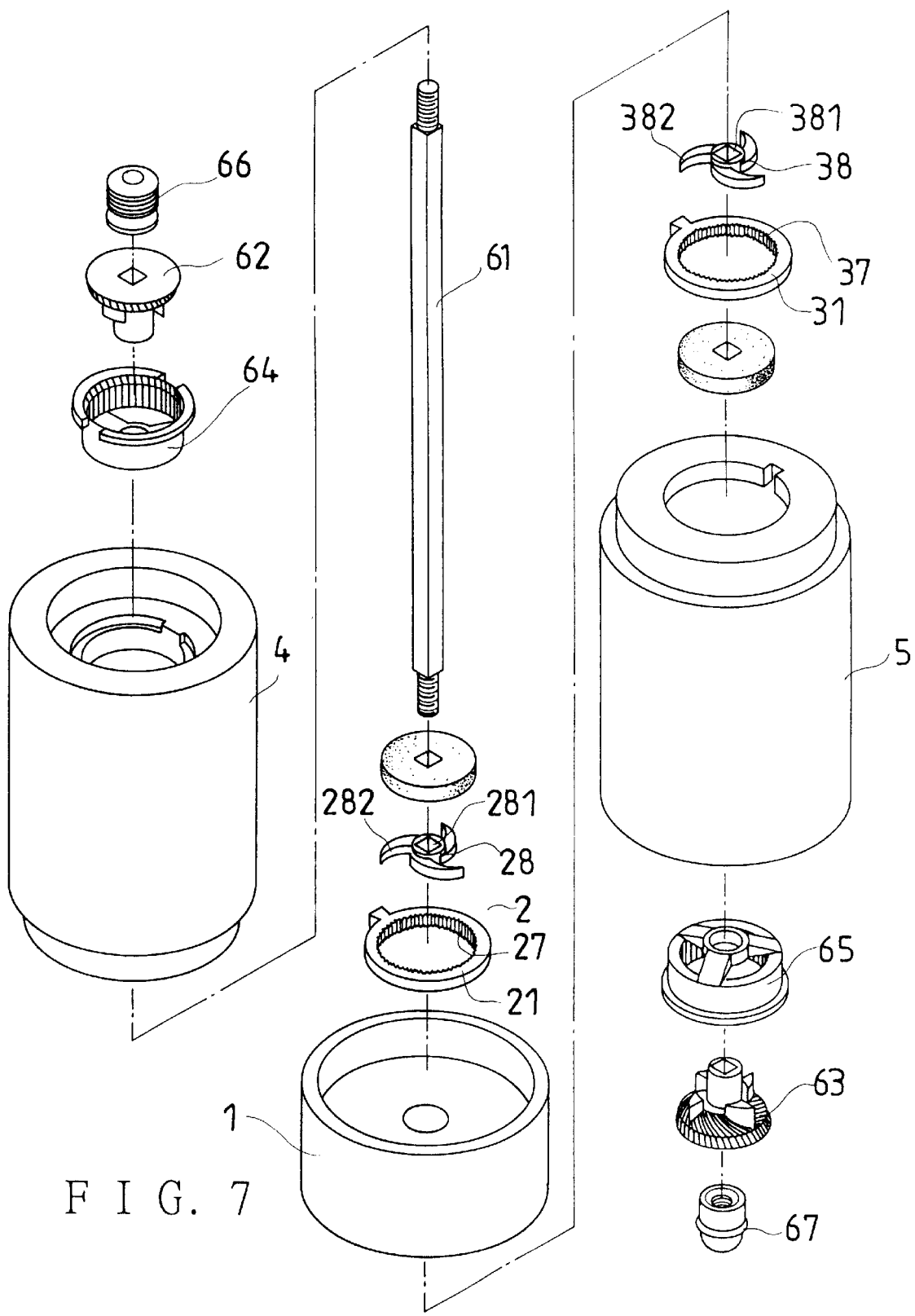
FIG. 7 is an exploded perspective view of the third embodiment of the present invention.
Figure 9:
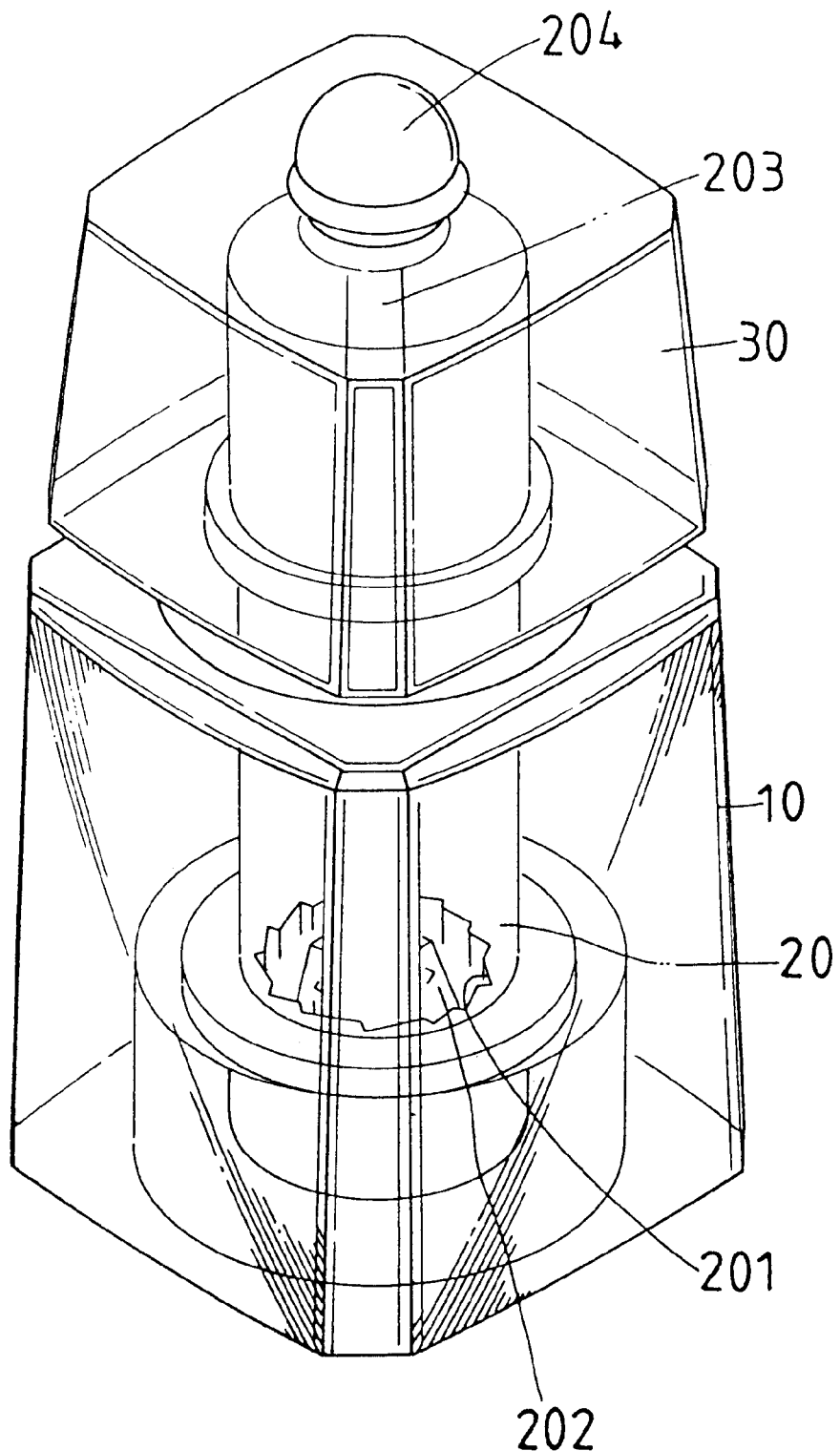
FIG. 9 is a perspective view of the conventional condiment grinding tool.

Referring to FIGS. 7 and 8, one-way members of the third embodiment includes rings 21 and 31 and engaging bodies 28 and 38. The rings 21 and 31 each has a sideways protrusion 212, 312 and ratchet teeth 27, 37 on the inner side. The engaging bodies 28 and 38 each has a central polygonal hole 281, 381 and several locking protrusions 282, 382. The rings 21 and 31 and engaging bodies 28 and 38 are passed around the shaft 61 having a polygonal shape. And, of course the rings 21 and 31 are secured in the first receiving holes 43 and 53 of the housing 4 and 5 respectively like the corresponding parts of the earlier embodiments. When the grinding tool is upright, i.e. the first housing 4 is kept above the second housing 5, and when the first housing 4 is turned clockwise relative to the second housing 5, the ratchet teeth 27 will make the engaging body 28 turn so as to cause the grinding assembly in the second housing to grind the condiment. When the grinding tool is moved to the upside down position, and the second housing 5 is turned counterclockwise with the first housing 4 (currently in the lower position) being held still, the inner grinding element 62 of the first grinding assembly will turn relative to the outer one 64 to grind the other kind of condiment.

From the above description, we can see that the condiment grinding tool can contain two different kinds of condiments in two compartments, and grind the condiments individually, one in the upright position, and the other in the upside down position. Therefore, the number of grinding tools for the various condiments in the kitchen can be reduced with the grinding tools of the kind.

What is claimed is:

1. A bifunction condiment grinding tool, comprising:
   an interposed member having a central hole;
   first and second housings each turnably connected to one end of said interposed member; said first and said second housings each having a first receiving hole adjacent to said interposed member, and a second receiving hole at other end; said first receiving holes communicating with a respective one of said second holes; said first and said second housings containing a first and a second condiment respectively;
   first and second one-way members disposed in said first and said second housings respectively; said first and said second one-way members each having a main body secured to one of said first receiving holes;
   a shaft passed through said one-way members and said central hole of said interposed member, at least a portion of said shaft member having a polygonal sectional contour;
   first and second grinding assemblies each including an inner grinding element and an outer grinding element; said outer grinding elements being each secured in one of said second receiving holes of said housings; said inner grinding elements being each connected to said polygonally contoured portion of said shaft and turnably received in one of said outer grinding elements;
   said one-way members being disposed about an intermediate portion of said shaft, said first one-way member being connected in selectively engaged manner to said shaft for angular displacement therewith in a first direction when said first housing is in an upright position where said first housing is above said second housing, said second one-way member being connected in selectively engaged manner to said shaft for angular displacement therewith in a second direction opposite said first direction when said first housing is in an upside down position where said second housing is above said first housing;
   whereby said second condiment is ground by said second grinding assembly when said first housing is kept in said upright position and turned in said first direction relative to said second housing, and said first condiment is ground by said first grinding assembly when said second housing is turned relative to said first housing in said second direction with said first housing being kept in said upside down position.

2. The bifunction condiment grinding tool as claimed in claim 1, wherein said interposed member has receiving rooms at said two ends, and said housings each has a connecting end portion around said first receiving hole; said housings being connected to said interposed member with said connecting end portions being passed into a respective one of said receiving rooms.

3. The bifunction condiment grinding tool as claimed in claim 1, wherein said main bodies of said one-way members each has a central round hole, and a plurality of curved slots around said round hole, and said shaft has a middle cylindrical portion, and two polygonal rods projecting from two ends of said cylindrical portion; said curved slots each having an engaging end portion communicating with said round hole, and receiving an engaging block biased to said engaging end portion by a spring;
   said engaging blocks of said first one-way member engaging said cylindrical portion so as to cause said shaft to turn when said main body of said first one-way member is turned in said first direction with said first housing being in said upright position; said engaging blocks of said second one-way member disengaging said cylindrical portion when said main body of said first one-way member is turned in said first direction;
   said engaging blocks of said second one-way member engaging said cylindrical portion so as to cause said shaft to turn when said main body of said second one-way member is turned in said second direction with said first housing being in said upside down position; said engaging blocks of said first one-way member disengaging said cylindrical portion when said main body of said second one-way member is turned in said second direction.

4. The bifunction condiment grinding tool as claimed in claim 3, wherein said cylindrical portion of said shaft has an engaging bar projecting sideways and along a length of a middle part thereof, and said interposed member has an engaging gap formed on an edge of said central hole thereof for allowing said engaging bar to be fitted into when said shaft is passed through said central hole of said interposed member.

5. The bifunction condiment grinding tool as claimed in claim 1, wherein said one-way members each further has an engaging body, and said main bodies each takes a form of a ring, and said shaft has a polygonal section; said engaging bodies each having a central polygonal hole, and several receiving rooms each receiving an engaging block biased to an engaging end portion of said receiving room; said shaft being passed through said polygonal holes of said engaging bodies; said engaging bodies being received in a respective one of said ring-shaped main bodies for said engaging blocks to unlockably engage an inner side of said ring-shaped main body.

6. The bifunction condiment grinding tool as claimed in claim 1, wherein said one-way members each further has an engaging body, and said main bodies each takes a form of ring having ratchet teeth on an inner side, and said shaft has a polygonal section; said engaging bodies each having a central polygonal hole, and a plurality of locking protrusions; said shaft being passed through said polygonal holes of said engaging bodies; said engaging bodies being each received in a respective one of said ring-shaped main bodies so as to allow said locking protrusions to engage said ratchet teeth in an one-way manner.

7. The bifunction condiment grinding tool as claimed in claim 3, 5 or 6, wherein said first receiving holes of said housing each has a gap on an edge, and said main bodies of said one-way members each has a sideways protrusion fitted into a respective one of said gaps.

8. The bifunction condiment grinding tool as claimed in claim 3, 5 or 6, wherein said shaft has threaded portions at two ends thereof, each being screwed into a knob disposed on said inner grinding elements.

9. The bifunction condiment grinding element as claimed in claim 1, wherein said one-way members each has a cover disposed on said main body thereof.

10. The bifunction condiment grinding tool as claimed in claim 1, wherein said second receiving holes of said housing each has a plurality of holding trenches on an edge, and engaging blocks between said holding trenches, and said outer grinding elements of said grinding assemblies each has flanges, and engaging gaps between said flanges; said outer elements being secured in said second receiving holes with said flanges being held in said holding trenches and with said engaging gaps being fitted onto said engaging blocks.

* * * * *